United States Patent
Liu et al.

(10) Patent No.: US 11,194,697 B2
(45) Date of Patent: *Dec. 7, 2021

(54) REAL-TIME PROCESSING OF DATA STREAMS RECEIVED FROM INSTRUMENTED SOFTWARE

(71) Applicant: Splunk Inc., San Francisco, CA (US)

(72) Inventors: Phillip Liu, Palo Alto, CA (US); Arijit Mukherji, Fremont, CA (US); Rajesh Raman, Palo Alto, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,860

(22) Filed: Aug. 21, 2019

(65) Prior Publication Data
US 2020/0050535 A1 Feb. 13, 2020

Related U.S. Application Data

(63) Continuation of application No. 15/005,489, filed on Jan. 25, 2016, now Pat. No. 10,394,692.
(Continued)

(51) Int. Cl.
*G06F 11/36* (2006.01)
*G06F 16/2455* (2019.01)
(Continued)

(52) U.S. Cl.
CPC ...... *G06F 11/3644* (2013.01); *G06F 11/3006* (2013.01); *G06F 11/3082* (2013.01); *G06F 16/24568* (2019.01); *G06F 11/323* (2013.01)

(58) Field of Classification Search
CPC ........... G06F 11/3644; G06F 16/24568; G06F 11/3006; G06F 11/3082; G06F 11/323
See application file for complete search history.

(56) References Cited

U.S. PATENT DOCUMENTS

| | | | |
|---|---|---|---|
| 5,872,909 A | * | 2/1999 | Wilner ............... G06F 11/0715 714/38.12 |
| 6,097,399 A | | 8/2000 | Bhatt et al. |

(Continued)

FOREIGN PATENT DOCUMENTS

| | | |
|---|---|---|
| AU | 2015328574 A1 | 4/2017 |
| AU | 2015364688 A1 | 6/2017 |

(Continued)

OTHER PUBLICATIONS

International Search Report for International Application No. PCT/US2015/051458, dated Dec. 17, 2015, 2 pages.
(Continued)

*Primary Examiner* — Matthew J Brophy
(74) *Attorney, Agent, or Firm* — McDermott Will & Emery LLP

(57) ABSTRACT

An analysis system receives data streams generated by instances of instrumented software executing on external systems. The analysis system evaluates an expression using data values of the data streams over a plurality of time intervals. For example, the analysis system may aggregate data values of data streams for each time interval. The analysis system determines whether or not a data stream is considered for a time interval based on when the data value arrives during the time interval. The analysis system determines a maximum expected delay value for each data stream being processed. The analysis system evaluates the expression using data values that arrive before their maximum expected delay values. The analysis system also determines a failure threshold value for a data stream. If a data value of a data stream fails to arrive before the failure threshold value, the analysis system marks the data stream as dead.

30 Claims, 8 Drawing Sheets

Related U.S. Application Data

(60) Provisional application No. 62/109,308, filed on Jan. 29, 2015.

(51) Int. Cl.
*G06F 11/30* (2006.01)
*G06F 11/32* (2006.01)

(56) References Cited

U.S. PATENT DOCUMENTS

| | | | | |
|---|---|---|---|---|
| 7,269,824 | B2* | 9/2007 | Noy | G06F 11/3409 |
| | | | | 714/E11.192 |
| 7,389,497 | B1* | 6/2008 | Edmark | G06F 11/3612 |
| | | | | 714/E11.207 |
| 7,526,685 | B2* | 4/2009 | Noy | G06F 11/3438 |
| | | | | 702/186 |
| 8,176,480 | B1 | 5/2012 | Spertus | |
| 8,739,143 | B2* | 5/2014 | LaFrance-Linden | G06F 8/443 |
| | | | | 717/154 |
| 9,479,414 | B1* | 10/2016 | Rustad | G06F 11/30 |
| 9,578,372 | B2* | 2/2017 | Xu | H04N 21/4392 |
| 9,665,474 | B2* | 5/2017 | Li | G06F 11/3688 |
| 9,760,353 | B2* | 9/2017 | Raman | G06F 11/34 |
| 9,804,830 | B2 | 10/2017 | Raman et al. | |
| 9,804,951 | B2 | 10/2017 | Liu et al. | |
| 9,846,574 | B2 | 12/2017 | Raman et al. | |
| 9,846,632 | B2 | 12/2017 | Liu et al. | |
| 9,892,020 | B1 | 2/2018 | Ophir et al. | |
| 10,394,692 | B2 | 8/2019 | Liu et al. | |
| 10,394,693 | B2 | 8/2019 | Liu et al. | |
| 10,409,568 | B2 | 9/2019 | Liu et al. | |
| 10,437,705 | B2 | 10/2019 | Liu et al. | |
| 2003/0093772 | A1 | 5/2003 | Stephenson | |
| 2005/0055322 | A1* | 3/2005 | Masters | H04L 29/06 |
| 2007/0169055 | A1* | 7/2007 | Greifeneder | G06F 11/3404 |
| | | | | 717/158 |
| 2008/0127149 | A1* | 5/2008 | Kosche | G06F 8/443 |
| | | | | 717/158 |
| 2009/0249308 | A1 | 10/2009 | Li et al. | |
| 2009/0271529 | A1* | 10/2009 | Kashiyama | G06F 16/2455 |
| | | | | 710/1 |
| 2010/0138438 | A1 | 6/2010 | Torikai et al. | |
| 2010/0293535 | A1 | 11/2010 | Andrade et al. | |
| 2011/0007638 | A1* | 1/2011 | Xu | H04L 69/16 |
| | | | | 370/252 |
| 2012/0078975 | A1 | 3/2012 | Chen et al. | |
| 2012/0304172 | A1* | 11/2012 | Greifeneder | G06F 11/3419 |
| | | | | 718/1 |
| 2013/0179868 | A1 | 7/2013 | Greifeneder et al. | |
| 2013/0263093 | A1* | 10/2013 | Brandt | G06F 11/3466 |
| | | | | 717/128 |
| 2013/0283102 | A1* | 10/2013 | Krajec | G06F 11/3433 |
| | | | | 714/38.1 |
| 2013/0290450 | A1* | 10/2013 | Butler | G06Q 30/0201 |
| | | | | 709/206 |
| 2014/0019598 | A1 | 1/2014 | Krajec | |
| 2014/0040213 | A1 | 2/2014 | Rossi | |
| 2014/0095541 | A1 | 4/2014 | Herwadkar et al. | |
| 2014/0195861 | A1* | 7/2014 | Singh | G06F 11/076 |
| | | | | 714/47.2 |
| 2014/0215443 | A1* | 7/2014 | Voccio | G06F 11/3688 |
| | | | | 717/128 |
| 2015/0286548 | A1* | 10/2015 | Juli | G06F 11/3068 |
| | | | | 710/18 |
| 2016/0224459 | A1 | 8/2016 | Liu et al. | |
| 2016/0266728 | A1* | 9/2016 | Sankhavaram | G06F 9/46 |
| 2018/0011695 | A1 | 1/2018 | Raman et al. | |
| 2018/0046567 | A1 | 2/2018 | Liu et al. | |
| 2018/0307471 | A1 | 10/2018 | Liu et al. | |
| 2018/0307586 | A1 | 10/2018 | Liu et al. | |
| 2020/0042429 | A1 | 2/2020 | Liu et al. | |
| 2020/0050437 | A1 | 2/2020 | Raman et al. | |
| 2020/0050535 | A1 | 2/2020 | Liu et al. | |

FOREIGN PATENT DOCUMENTS

| | | |
|---|---|---|
| AU | 2016211697 A1 | 8/2017 |
| CA | 2962760 A1 | 4/2016 |
| CA | 3058839 A1 | 6/2016 |
| CA | 2969131 A1 | 5/2017 |
| CA | 2974386 A1 | 7/2017 |
| CN | 101193055 A | 6/2008 |
| CN | 104145459 A | 11/2014 |
| CN | 106796520 A | 5/2017 |
| CN | 107111527 A | 8/2017 |
| CN | 107430545 A | 12/2017 |
| EP | 3204848 A1 | 8/2017 |
| EP | 3234776 A1 | 10/2017 |
| EP | 3251015 A1 | 12/2017 |
| JP | 2002-278780 A | 9/2002 |
| JP | 2004-348670 A | 12/2004 |
| JP | 2009-266007 A | 11/2009 |
| JP | 2010-134599 A | 6/2010 |
| JP | 2011-180957 A | 9/2011 |
| JP | 2012-164369 A | 8/2012 |
| JP | 2017-535012 A | 11/2017 |
| JP | 2018-506104 A | 3/2018 |
| JP | 2018-508881 A | 3/2018 |
| WO | 2011/158372 A1 | 12/2011 |
| WO | 2012/128388 A1 | 9/2012 |
| WO | WO 2013/186831 A1 | 12/2013 |
| WO | WO 2012/046316 A1 | 2/2014 |
| WO | 2014/109038 A1 | 7/2014 |
| WO | WO 2014/113273 A2 | 7/2014 |
| WO | WO 2016/057211 A1 | 4/2016 |
| WO | WO 2016/100534 A1 | 6/2016 |
| WO | WO 2016/123126 A1 | 8/2016 |

OTHER PUBLICATIONS

Written Opinion for International Application No. PCT/US2015/051458, dated Dec. 17, 2015, 10 pages.

Emaili, "Data stream processing in complex applications." In: Diss., Eidgenossische Technische Hochschule ETH Zurich. 2011 (2011). Retrieved from <http://e-collection.library.ethz.ch/eserv/eth:4662/eth-4662-02.pdf>, entire document.

Zhang, et al., "Temporal aggregation over data streams using multiple granularities." In: Advances in Database Technology—EDBT 2002. Mar. 14, 2002 (Mar. 14, 2002). Retrieved from <http://www.zgking.com:8080/home/donghui/publications/hta.pdf>, entire document.

Chinese Office Action for Chinese Application No. 2015800550663, dated Aug. 5, 2019, with English translation, 10 pages.

Australia IP Office, 2nd Examination Report for related Australian Patent Application No. 2015328574, dated Aug. 19, 2020, 3 pgs.

Indian Patent Office, First Examination Report for related Indian Application No. 201747025793 dated Jul. 11, 2020, Indian and English translations—8 pgs.

Indian Patent Office, First Examination Report for related Indian Application No. 20174700939 dated Aug. 12, 2020, Indian and English translations—13 pgs.

U.S./RO—PCT International Preliminary Report on Patentability for related International Application No. PCT/US2015/051458, dated Apr. 20, 2017, 12 pgs.

U.S./RO—PCT International Preliminary Report on Patentability for related PCT Application No. PCT/US2015/066132, dated Jun. 29, 2017, 11 pqs.

U.S./RO—PCT International Preliminary Report on Patentability for related PCT Application No. PCT/US2016/014957, dated Aug. 10, 2017, 12 pgs.

Australia IP Office, 1st Examination Report for related Australian Patent Application No. 2015328574, dated Apr. 17, 2020, 3 pgs.

Australia IP Office, 1st Examination Report for related Australian Patent Application No. 2015364688, dated Jun. 6, 2020, 4 pgs.

Canadian IP Office, 1st Examination Report for related Canadian Application No. 2,962,760, dated Feb. 6, 2018, 3 pqs.

Canadian IP Office, 2nd Examination Report for related Canadian Application No. 2,962,760, dated Jan. 24, 2020, 3 pqs.

(56) References Cited

OTHER PUBLICATIONS

Canadian IP Office, 1st Examination Report for related Canadian Application No. 2,969,131, dated Mar. 27, 2018, 4 pqs.
Canadian IP Office, 2nd Examination Report for related Canadian Application No. 2,974,386, dated Apr. 5, 2019, 4 pages.
Japan IP Office, Official Notice of Rejection dated Jul. 23, 2019 for related JP Patent Application No. 2017-538572—Japanese and English translations—14 pqs.
Chinese National IP Administration, Office Action dated Mar. 21, 2020, for related Chinese Patent Application No. 201680016597.6—Chinese and English translation—19 pgs.
Chinese National IP Administration, Office Action dated Apr. 3, 2020, for related Chinese Patent Application No. 201580069546.5—Chinese and English translations—7 pgs.
Indian Patent Office, First Examination Report for related Indian Application No. 20174701799 dated Sep. 18, 2020, Indian and English translations—8 pgs.
Australian IP Office, First Examination Report for related Australian Patent Application No. 2020200713 dated Oct. 16, 2020, 5 pgs.
Australia IP Office, 2nd Examination Report for related Australian Patent Application No. 2020200713 dated Dec. 14, 2020, 4 pgs.
Canadian IP Office, 1st Examination Report for related Canadian Application No. 3,058,839 dated Nov. 12, 2020, 8 pgs.
Chinese National IP Administration, 3rd Office Action for related Chinese Patent Application No. 201580055066.3, dated Oct. 12, 2020, Chinese and English translations—26 pgs.
European Patent Office, Extended European Search Report and Opinion for related EP Patent Application No. 20182552.8 dated Dec. 4, 2020, 12 pgs.
Chinese National IP Administration, 2nd Office Action for related Chinese Patent Application No. 201580069546.5, dated Dec. 3, 2020,—Chinese and English translations—4 pgs.
Chinese National IP Administration, Office Action for related Chinese Patent Application No. 201580055066.3—Chinese and English translations—dated Jun. 2, 2020, 7 pgs.
Japan IP Office, 1st Examination Report for related Japanese Patent Application No. 2020-126662, dated Aug. 17, 2021, Japanese and English translations—8 pgs.
Japan IP Office, 1st Examination Report for related Japanese Patent Application No. 2020-137011, dated Sep. 14, 2021, Japanese and English translations—12 pgs.

\* cited by examiner

REAL-TIME PROCESSING OF DATA STREAMS RECEIVED FROM INSTRUMENTED SOFTWARE

CROSS REFERENCES TO RELATED APPLICATIONS

This application is a continuation of prior, co-pending U.S. application Ser. No. 15/005,489, filed on Jan. 25, 2016, which claims the benefit of U.S. Provisional Patent Application No. 62/109,308 filed Jan. 29, 2015, both of which are incorporated by reference in their entirety.

BACKGROUND

The disclosure relates to analysis of instrumented software in general and more specifically to real-time processing of data streams received from instrumented software.

Software developers monitor different aspects of software they develop by instrumenting code. These include performance of the software, errors encountered during execution of the software, significant events encountered during execution of the software, parts of code that are being executed and parts that are not being executed, and so on. Conventional techniques for instrumenting code include statements in the code that log information to log files or print information on screens. This type of instrumentation is suitable for simple applications, for example, applications having a simple flow of execution on a single machine. However, these techniques for instrumenting software are inadequate for complex applications with complicated flow of execution, for example, applications that are distributed across multiple systems, each system executing multiple processes or threads of execution.

Processing data generated by instrumented software of a distributed system requires assimilating the data for analysis. Assimilating and processing data sent by instrumented software executing on distributed systems is complicated by the fact that data values sent by different systems at the same time can encounter different network delays and therefore take different amounts of time to reach the system assimilating the data even. Furthermore, one or more systems executing the instrumented software may fail. As a result, the system assimilating the data needs to determine whether a data value is late due to network delays or not likely to arrive due to failure of the data source. Making these determinations results in delays in processing the data values and/or inaccuracies in the results presented. Accordingly, conventional systems for generating reports based on instrumentation of software are often inadequate for analyzing highly distributed systems running instrumented software.

SUMMARY

Described embodiments process data generated by instrumented software. Software developers often including code snippets for instrumenting the code in software being developed. An analysis system receives data streams generated by instrumented software executing on external systems. The analysis system performs analysis of the data streams received. The analysis system evaluates an expression using data values of the data streams over a plurality of time intervals. For example, the analysis system may aggregate data values of data streams for each time interval and send the result for presentation via a chart updated in real-time.

The analysis system determines whether or not a data stream is considered for evaluation of the expression in a time interval based on the time of arrival of the data value during the time interval. The analysis system excludes data streams for which the data values arrive late during the time interval. The analysis system determines a maximum expected delay value for each data stream being processed. The analysis system excludes data values that fail to arrive before their maximum expected delay value during a time interval. Accordingly, the analysis system evaluates the expression for that time interval without considering these data streams. The analysis system sends the result of evaluation of the expression for each time interval for presentation.

In some embodiments, the analysis system determines the maximum expected delay value based on delay of past data values of the data stream. For example, the analysis system may determine the maximum expected delay value for a data stream based on a moving average of a number of data values of the data stream. The analysis system updates the maximum expected delay value periodically, for example, for each time interval.

In some embodiments, the analysis system further determines a failure threshold value for a data stream. If a data value of a data stream fails to arrive before the failure threshold value of a data stream, the analysis system marks the data stream as dead. Accordingly, the analysis system does not consider the data stream for evaluation of the expression for subsequent time intervals. The analysis system marks the data stream as alive when the next data value of the data stream is received. The analysis system starts considering the data stream for evaluation of the expression, once the data stream is marked alive.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overall System Environment

Figure 1:
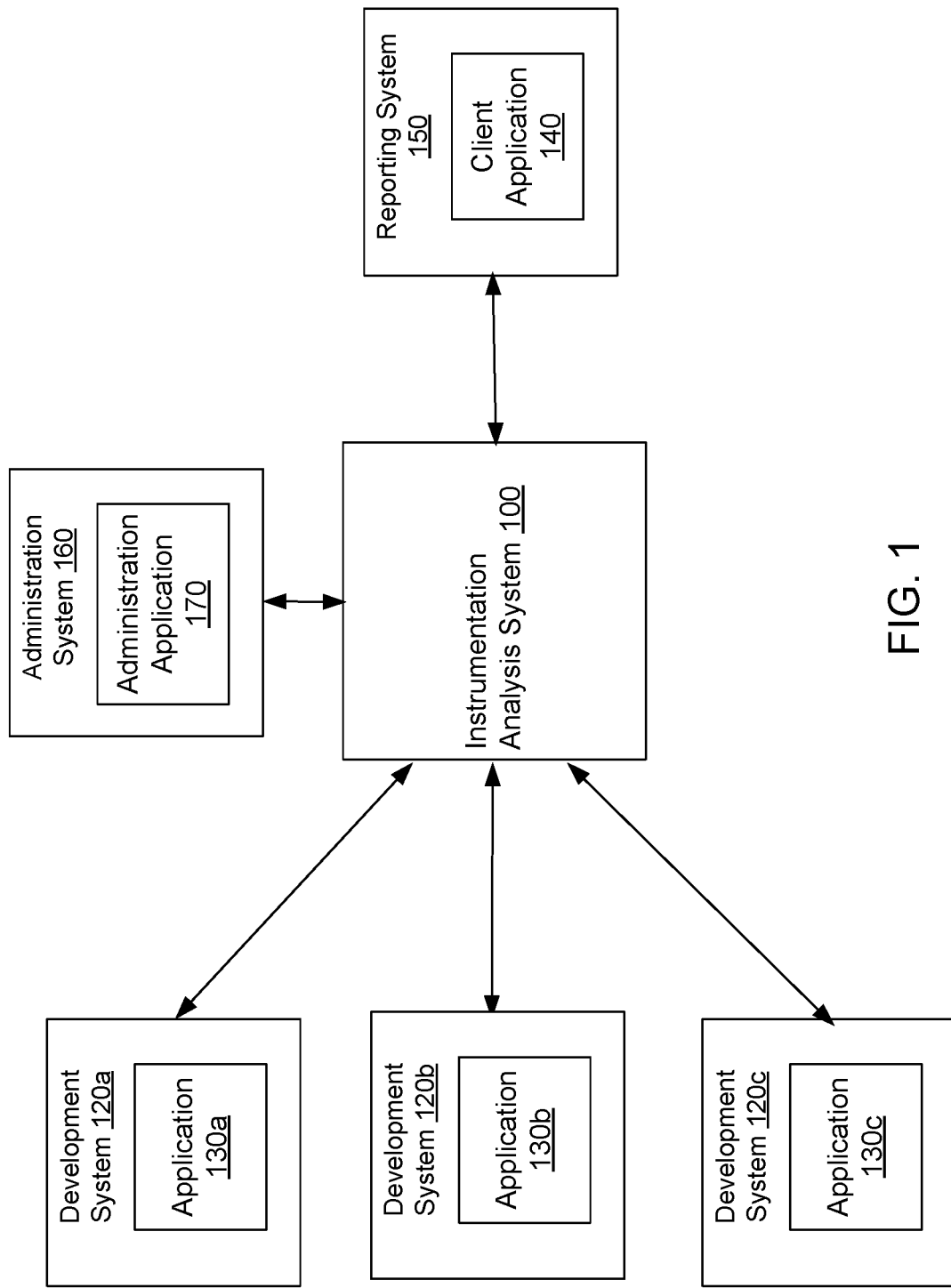
FIG. 1 shows the overall system environment for generating real-time reports based on data streams received from instrumented software, according to an embodiment.

FIG. 1 shows the overall system environment for generating real-time reports based on data streams received from instrumented software, according to an embodiment. The overall system environment includes an instrumentation analysis system 100, one or more development systems 120, an administration system 160, and a reporting system 150. In other embodiments, more or less components than those indicated in FIG. 1 may be used. For example, development system 120, administration system 160, and reporting system 150 may interact with instrumentation analysis system 100 via a network (not shown in FIG. 1). Furthermore, there may be more or less instances of each system shown in FIG. 1, for example, there may be multiple reporting systems 150.

FIG. 1 and the other figures use like reference numerals to identify like elements. A letter after a reference numeral, such as "130*a*," indicates that the text refers specifically to the element having that particular reference numeral. A reference numeral in the text without a following letter, such as "130," refers to any or all of the elements in the figures bearing that reference numeral (e.g. "130" in the text refers to reference numerals "130*a*" and/or "130*b*" in the figures).

The instrumentation analysis system 100 receives data comprising values of metrics sent by external systems, for example, development systems 120 (the instrumentation analysis system 100 may also be referred to herein as an analysis system or a data analysis system). A development system 120 executes software that has been instrumented, for example, application 130. Although, application 130 is shown in FIG. 1 as an example of instrumented software, the techniques disclosed herein are not limited to application software but are applicable to other kinds of software, for example, server software, software executing on client devices, websites, and so on.

The software executing on a development system 120 is configured to send information generated as a result of instrumenting the software to instrumentation analysis system 100. For example, the application 130 may send data periodically to instrumentation analysis system 100. Different applications 130 may send the same metric or different metrics at different rates. The same application may send different metrics at different rates. The application 130 sends data to the instrumentation analysis system 100 by invoking application programming interface (API) supported by the instrumentation analysis system 100.

The application 130 (or any other software) may be instrumented to add counters or gauges to the application. A counter comprises instructions that store a value that is incremented upon occurrence of certain event in the software. The counter may be used to determine the number of times a particular part of the code is executed, for example, a function or a method, a particular branch of a conditional code, an exception, a loop, and so on. The application 130 is an example of a data source of a data stream.

Typically a counter value changes monotonically, i.e., a counter value may increase/decrease monotonically. Values of a counter may be compared to determine the change in the particular counter value at two different points in time. For example, the number of times a particular event occurs within a time interval between times t1 and t2 may be determined by computing the change in a corresponding counter value from t1 to t2. The APIs of the instrumentation analysis system 100 may be invoked by the application 130 to send the current value of the counter to the instrumentation analysis system 100.

Following is an example of instrumented code of an application 130. The following instruction included in the code being instrumented creates a counter object for tracking count of an action or entities.

counter1=createCounter(source="web1",
   metric="metric1");

The above instruction creates a counter object and assigns it to the variable counter1. The counter object is associated with a source "web1" and metric "metric1." In an embodiment, the source and the metric values uniquely identify the data stream associated with the counter (or a gauge). In other embodiments, more or fewer key value pairs may be used to uniquely identify a data stream.

One or more of the values specified during creation of a counter are received when data corresponding to the counter is sent by the instrumented code to the instrumentation analysis system 100. For example, typically the source and metric values are received with each tuple of values received in the data stream along with the data value being reported. Optionally the tuple of values may include a timestamp, for example, the timestamp when the data value being reported was captured by the instrumented software.

The instrumented code of application 130 may include instructions to update the counter value at various places in the code. For example, the counter counter1 may be incremented by executing the instruction "counter1.increment( )." The counter may be incremented to track various actions or entities associated with the code. For example, the counter may be incremented whenever a particular function or method is called, the counter may be incremented whenever a particular branch of a conditional expression is executed, the counter may be incremented whenever an object of a particular type is created, for example, by incrementing the counter in a constructor of an object. The increment instruction of the counter may be called conditionally, for example, if a function is invoked with a particular combination of parameters. The application 130 communicates the counter value to the instrumentation analysis system 100 by invoking an API of the instrumentation analysis system 100.

A counter defined in the instrumented code may reset itself periodically. For example, the counter may be reset after a specific time interval that is configurable. In this case, the counter values received may not increase (or decrease) monotonically since the value may be reset at the end of an interval. A counter may be cumulative, i.e., the counter does not reset unless explicit instruction is provided to reset it. In this situation, the values of the cumulative counter change monotonically, i.e., increase (or decrease) monotonically unless explicitly reset by a user.

A gauge comprises instructions to measure certain runtime characteristics of the application 130, for example, heap size, number of cache misses or hits, active memory used, CPU (central processing unit) utilization, total time taken to respond to a request, time taken to connect to a service, and so on. A gauge may also be used to track certain application specific parameters or business related values, for example, number of transactions, number of users, and so on. The gauge may be invoked periodically at a time interval that is configurable. The value of the gauge is sent to instrumentation analysis system 100 periodically.

The administration system 160 allows a privileged user, for example, a system administrator to associate data streams with metadata. The administration system 160 comprises the administration application 170 that provides a user interface for a system administrator to specify the metadata. The metadata comprises properties, for example, name-value pairs (a property is also referred to herein as metadata tag or tag.) The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify applications 130.

The instrumentation analysis system 100 generates results of the reports and sends them for presentation in real-time as the instrumentation analysis system 100 receives data streams from instrumented software. The instrumentation analysis system 100 allows modifications to existing reports without requiring any modifications to the instrumented code of application 130. Furthermore new metadata can be defined for data streams that were previously received. Accordingly, a new report can be generated that is based on data that is being received as data streams as well as data that was previously stored (before the metadata associated with the data stream). For example, report providing a moving average over a large time interval can be generated and would compute the moving average based on data that is currently being received as well as data that was previously received (before the metadata used in the report was associated with the data). And furthermore, these new reports can be defined without having to modify the instrumented software (by re-instrumenting the software) or having to re-deploy the instrumented software.

Furthermore, the instrumentation analysis system 100 provides separation of the metadata describing the data streams from the data of the data streams. Accordingly, the amount of data that needs to be transmitted from the development systems 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be a client device. The reporting system 150 includes a client application 140 that allows a user to interact with the instrumentation analysis system 100. In an embodiment, the client application 140 is an internet browser, which may include client side code (e.g., Java Script) for accessing the instrumentation analysis system 100. In other embodiments, client application 140 is a proprietary application developed for interacting with the instrumentation analysis system 100.

The reporting system 150 can be a conventional computer system (e.g., a desktop or laptop computer), a tablet, or a device having computer functionality such as a personal digital assistant (PDA), a mobile telephone, a smart phone or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage and input/output controller. The computing system used for hosting the instrumentation analysis system 100 is typically a server class system that uses powerful processors, large memory, and fast input/output systems compared to a typical computing system used, for example, as a reporting system 150.

In an embodiment, data from several development systems 120 may be consolidated, for example, by a server and the combined data sent to the instrumentation analysis system 100. For example, an enterprise may install a server that receives data stream internally from different development systems 120 and sends the combined data in a batch form to the instrumentation analysis system 100 periodically. This allows efficiency of external communication from the enterprise. However this configuration may result in delay in communicating information to the instrumentation analysis system 100 and the corresponding delay in reporting data by the reporting system 150.

System Architecture of the Instrumentation Analysis System

Figure 2:
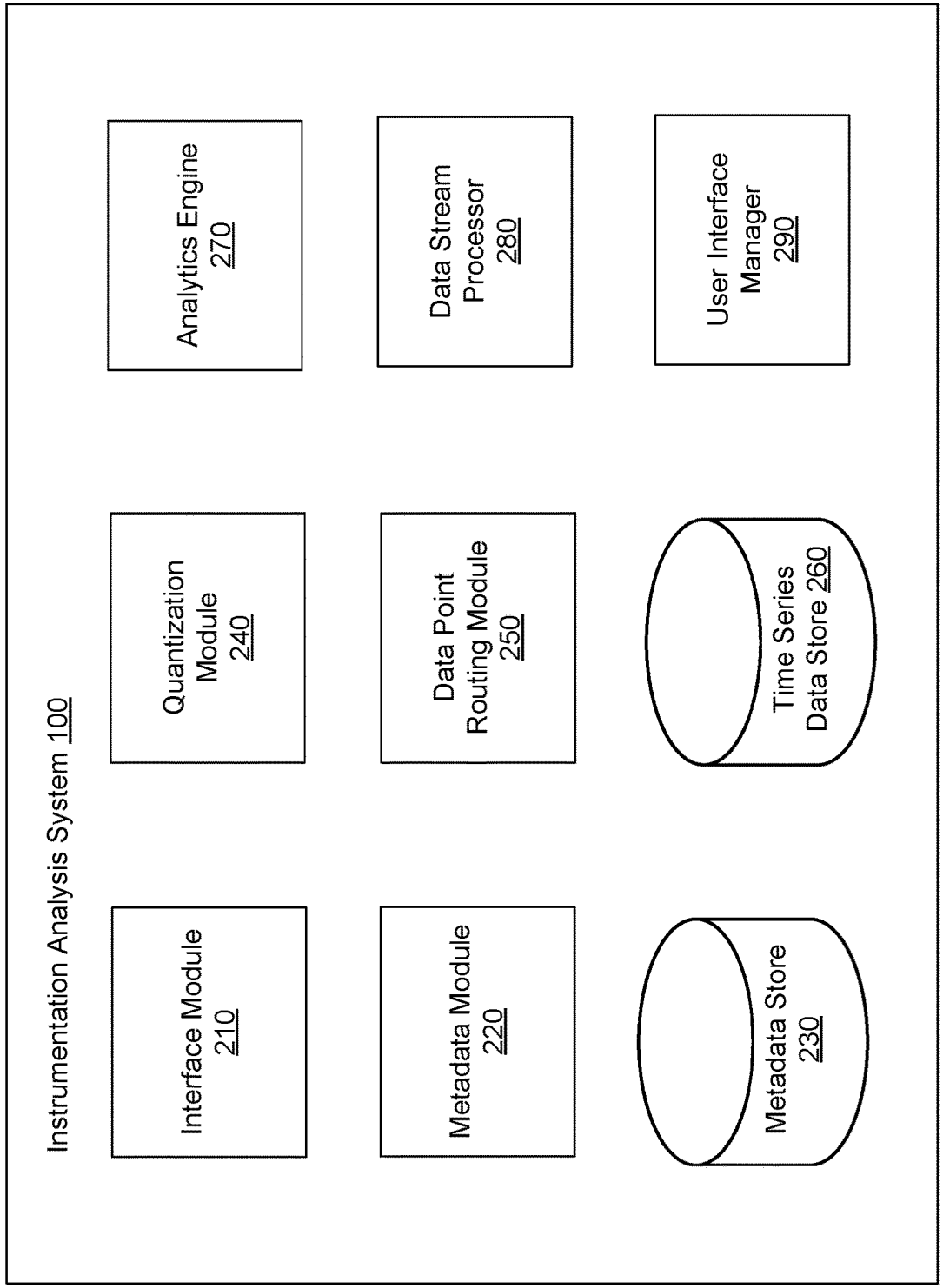
FIG. 2 shows the architecture of a system for generating real-time reports based on data streams received from instrumented software, according to an embodiment.

FIG. 2 shows the architecture of a system for generating real-time reports based on data streams received from instrumented software, according to an embodiment. The instrumentation analysis system 100 includes an interface module 210, a data stream processor 280, a quantization module 240, a metadata module 220, a metadata store 230, a data point routing module 250, an analytics engine 270, a user interface manager 290, and a time series data store 260. In other embodiments, the instrumentation analysis system 100 may include other modules not described herein. Functionality indicated as provided by a particular module may be implemented by other modules instead.

The interface module 210 receives requests from external systems, for example, development systems 120 that send data streams to the instrumentation analysis system 100. The interface module 210 supports various application programming interfaces (APIs) that external systems can invoke. The interface module 210 receives and processes data provided by applications 130. The interface module 210 can receive and process data provided by applications 130 that are instrumented using functionality provided by different vendors, so long as the data conforms to a format specified by the API supported by the interface module 210.

The interface module 210 receives data in the form of a data stream from external systems such as development systems 120. In an embodiment, interface module 210 represents the data as tuples. A tuple of data received by the interface module comprises various elements including a metric identifier and a value of the metric. The metric identifier may be a name of the metric. A tuple of data may comprise other elements, for example, a timestamp corresponding to the time that the data was generated by the data source (e.g., the application 130 sending the data), and properties associated with the data. In an embodiment, the timestamp associated with a tuple represents the time that the data value was received by the instrumentation analysis system 100. The properties associated with the data may be provided in the form of name-value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name ml, and a hostname hl, all tuples with metric name ml and hostname hl are assigned the same time series identifier. Accordingly, the tsid uniquely identifies all tuples of a data stream received by the instrumentation analysis system 100. The interface module 210 provides the data values of the data streams to the data stream processor 280 for further processing.

The data stream processor 280 processes data of different data streams to prepare the data for analysis by the analytics engine 270. The data stream processor 280 determines the data values that are processed for a time interval and data values that are ignored during the time interval by the analytics engine from real time reports. The data stream processor 280 determines whether a data value is processed or ignored based on the time at which the data value arrives (or fails to arrive) during the time interval. In general, the data stream processor 280 processes data values that arrive early in the time interval and ignores data values that arrive late during the time interval.

The data stream processor 280 determines a maximum expected delay for a data stream and compares the time of arrival of data values with the maximum expected delay value to determine whether the data value is considered for a time interval. A data value that is considered is provided as input to an expression of a real-time report, for example, an expression aggregating data values of data streams.

The data stream processor 280 also determines failure threshold values for data streams. The data stream processor 280 marks a data stream as dead if no data value is received from that data stream for more than the failure threshold value. The data stream processor 280 stores the status of each data stream in the metadata store 230. The data stream processor 280 stops considering a dead data stream for subsequent time intervals. In other words, the data stream processor 280 does not wait for the maximum expected delay value of a dead data stream. The data stream processor 280 marks the data stream alive again if a data value is received from that data stream. Once the data stream is marked alive, the data stream processor 280 restarts considering the data stream again for subsequent time intervals.

The data streams processor 280 stores past data values for each data stream in memory and determines the value of the maximum expected delay using an aggregate value based on the past data values. For example, the maximum expected delay for a data stream may be obtained based on a moving average of N data values (say, N=5 or N=4). The data stream processor 280 may multiply the moving average value by a factor, such as 150% to account for fluctuations in the delay value.

In an embodiment, the data streams processor 280 re-computes the maximum expected delay value in the beginning of each time interval or at the end of the previous time interval. In another embodiment, the data streams processor 280 re-computes the maximum expected delay value periodically at a time interval that is greater than the time interval at which the analytics engine 270 evaluates expressions. For example, the data streams processor 280 may re-compute the maximum expected delay value once every five time intervals at which the analytics engine 270 evaluates expressions. In an embodiment, the data streams processor 280 receives a user configurable fixed value for a data stream as the maximum expected delay value or the failure threshold value. The data stream processor 280 identifies the data values that should be considered for this time interval and provides them to the quantization module 240 for further processing.

The quantization module 240 processes data values received so as to transform an input time series of data in which data is available at arbitrary time intervals to a time series in which data is available at regular time intervals. For example, the data values received in an input time series may occur at irregular interval, however, the quantization module 240 processes the data of the time series to generate a time series with data occurring periodically, such as every second, or every 5 seconds, or every 15 seconds, and so on. This process is referred to herein as quantization of the time series. In an embodiment, the interface module 210 creates multiple threads or processes, each thread or process configured to receive data corresponding to a data stream. Each thread or process invokes the quantization module 240 to perform quantization of the data received for each data stream for each time interval.

The metadata module 220 receives and stores metadata information describing various data streams received from the development systems 120. In an embodiment, the metadata stored in the metadata module 220 is received from a user, for example, a system administrator. The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata datastore 230 stores the metadata objects and their associations with the data streams. The metadata datastore 230 stores an identifier (ID) for each metadata object and the properties represented by the metadata object. In an embodiment, each data stream is associated with a time series identifier that uniquely identifies the data stream. The metadata datastore 230 stores an index that maps each metadata object to a set of time series identifier values. The metadata datastore 230 stores indexes that map various properties (or name-value pairs or tags) to sets of time series identifier values.

The metadata store 230 modifies a metadata object based on instructions received. For example, the metadata store 230 may modify, add or delete some properties represented by a metadata object. Alternatively, the metadata store 230 may modify the mapping from a metadata object to a data stream based on instructions received. For example, the metadata store 230 may associate a data stream with a metadata object or delete an association between a metadata object and a data stream.

In an embodiment, the metadata store 230 is represented as a relational database but may be represented as any other type of database or data store. The metadata store 230 may be a relational database storing tables that map metadata object IDs to time series IDs identifying data streams. Other database tables may store the properties associated with each metadata object as a mapping from metadata object ID to each property represented as a name-value pair.

The analytics engine 270 evaluates reports specifying expression based on metadata. The expression may be based on various operations, for example, aggregations and transformations. The expression may be obtained by compose various functions including aggregations and transformations in various ways as well as by composing other previously defined expressions. In an embodiment, the analytics engine 270 parses the expressions, generates an executable representation of the program, and executes the generated representation.

The time series data store 260 stores data received from various sources, for example, development systems 120. In an embodiment, the time series data store 260 also stores the time series data after the data is quantized. The time series data store 260 may also store rollup data for each time series. The time series data store 260 also stores results of various analytics requests, for example, results of various reports requested by user. The analytics engine 270 computes results for certain reports, for example, moving averages over intervals of time by combining data stored in the time series data store 260 with new data obtained as data stream from various sources.

The user interface manager 290 renders reports requested by users via a user interface, for example, a user interface of the client application 140 of the reporting system 150. In an embodiment, the client application 140 is an internet browser application and the user interface manager 290 generates a web page for display using the client application 140. In other embodiments, the client application 140 uses a proprietary protocol to communicate with the user interface manager 290. The user interface manager provides the report data to the client application 140 for presentation, for example, as a chart.

In an embodiment, the user interface manager 290 constantly updates the chart corresponding to a report displayed via the client application 140 based on the data of the data streams that arrives at the instrumentation analysis system 100. The instrumentation analysis system 100 is configured by a system administrator via the administration system 160 to generate data for reports based on data of the data streams. The instrumentation analysis system updates the displayed reports at a particular rate.

The instrumentation analysis system 100 also receives definition of a report that needs to be displayed via the reporting system 150. The report definition specifies an expression corresponding to the report to be displayed. For example, the expression may specify that an aggregate value of all data streams, grouped by certain metadata attribute needs to be displayed and updated every T seconds (e.g., T=1 second). The instrumentation analysis system 100 presents a real-time chart via the reporting system. A real-time chart refers to a chart that is updated as data values of data streams are received. In contrast, a conventional report is generated based on queries executed against data stored in a persistent storage of a database. In practice, a real-time chart does not get updated immediately as soon as the data is generated because of delays in transmission of the generated data via networks from development systems to the instrumentation analysis system 100, delays in processing of the data, and so on. However embodiments of the instrumentation analysis system minimize the delay between the time that the data values are generated by a data source (i.e., the instrumented software executing on an external system) and the time that the result of evaluation of an expression based on the data values generated is presented on the user interface of the reporting system 150.

Real-Time Reporting Based on Instrumented Software

Figure 3:
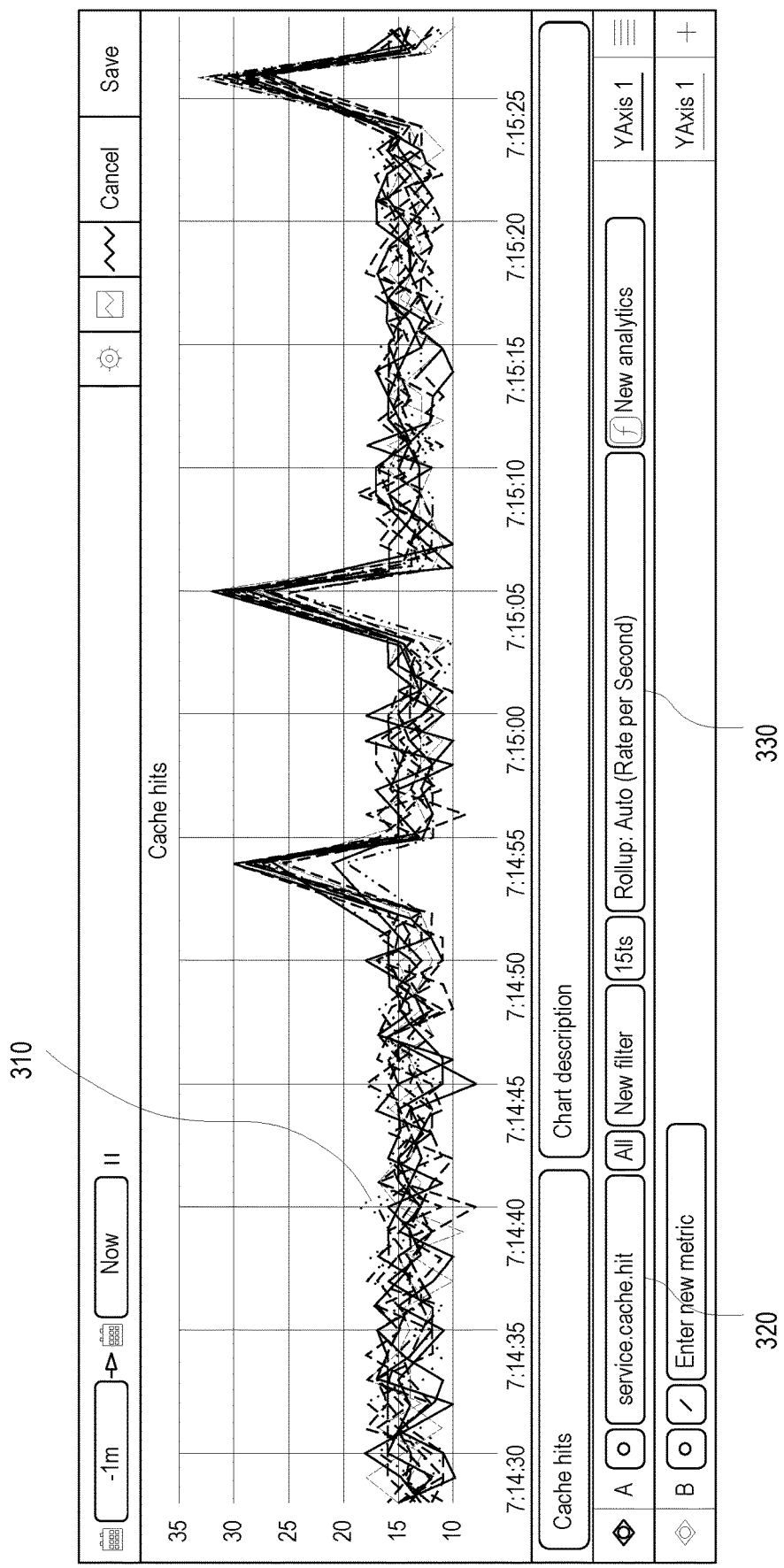
FIG. 3 shows a screenshot of a user interface displaying a chart updated in real-time based on data of data streams received by the instrumentation analysis system, according to an embodiment.
Figure 4:
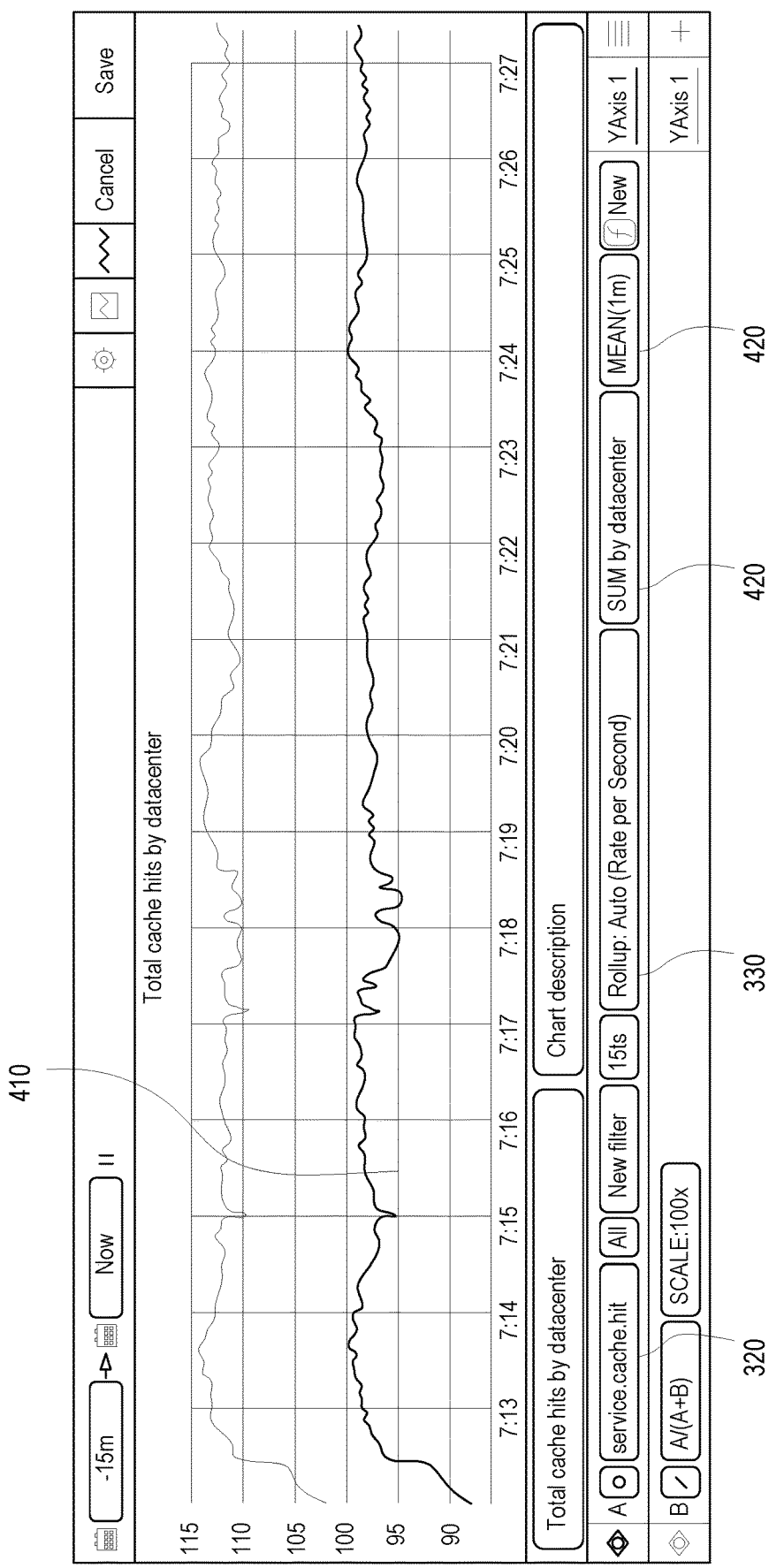
FIG. 4 shows a screenshot of a user interface displaying a chart updated in real-time showing an expression determining sum of data streams grouped by data centers, according to an embodiment.

The user interface manager 290 of the instrumentation analysis system 100 presents data generated by reports in real-time via a user interface. Development systems 120 executing instrumented software provide data values via network. Network causes the data values to arrive at the instrumentation analysis system 100 after a delay once the data value is generated and sent by the external system. FIGS. 3 and 4 show examples of reports that are presented on a user interface by the instrumentation analysis system 100.

FIG. 3 shows a screenshot of a user interface displaying a chart updated in real-time based on data of data streams received by the instrumentation analysis system, according to an embodiment. The screenshot shows several charts 310 displaying data streams representing metric 320 service.cache.hits. The metric represents cache hit values received from instrumented software executing on development systems 120. The values are rolled up to a time interval of 1 second. Accordingly, the cache hits values received in each time interval of one second are added together. There can be a large number of services reporting the metric service.cache.hits and accordingly a large number of charts 310 is displayed. FIG. 3 shows various widgets that allow a user to take actions, for example, select the metric that is reported by the user interface, perform rollups.

Large enterprises may have a very large number of development systems 120. Each development system 120 may execute multiple services, each service reporting the metrics. As a result, the number of charts displayed in FIG. 3 can be very large. A user can gain better insight into the data reported by data streams by grouping the data streams as shown in FIG. 4.

FIG. 4 shows a screenshot of a user interface displaying a chart updated in real-time showing an expression determining sum of data streams grouped by data centers, according to an embodiment. FIG. 4 shows widget 420 that allows specification of attribute by which the data streams are grouped and the aggregation operation performed for each group. As shown in FIG. 4, the charts 410 show data streams grouped by data center and summed for each group. Assuming there are only two data centers, the number of charts is reduced to two. Each chart 410 shows the sum of data values of data streams received from a particular data center.

The instrumentation analysis system 100 collects data values of various data streams and computes the values of an expression for display as a report. For example, the instrumentation analysis system 100 determines groups of data values based on data streams and computes the sums of data values for each data center to present the charts shown in FIG. 4. The instrumentation analysis system 100 performs the above computation for subsequent time intervals. Accordingly, for each time interval, the instrumentation analysis system 100 waits for data values of the data streams to arrive. Once the instrumentation analysis system 100 determines that all expected data values for the time interval have arrived, the instrumentation analysis system 100 performs the required computation and sends the result for display.

However, various data values from different data sources may arrive at different points in time within the time interval. Some data values may not even arrive within the time interval (e.g., they may arrive in the next time interval or even later.) Furthermore, certain data sources may fail (e.g., due to system crashes) and may not even send a data value for that time interval or for several subsequent time intervals, until the data source restarts. Due to network delays, delays in computing results, and system failures, the instrumentation analysis system 100 is able to provide result values for display only after a certain delay since the data was generated by the data sources. However, the earlier within the time interval the instrumentation analysis system 100 is able to present the result, the closer the reporting is to a real-time reporting. Embodiments of the invention allow the instrumentation analysis system to present results of evaluation of expressions based on data streams early in each time interval while maximizing the accuracy of the results.

Figure 5:
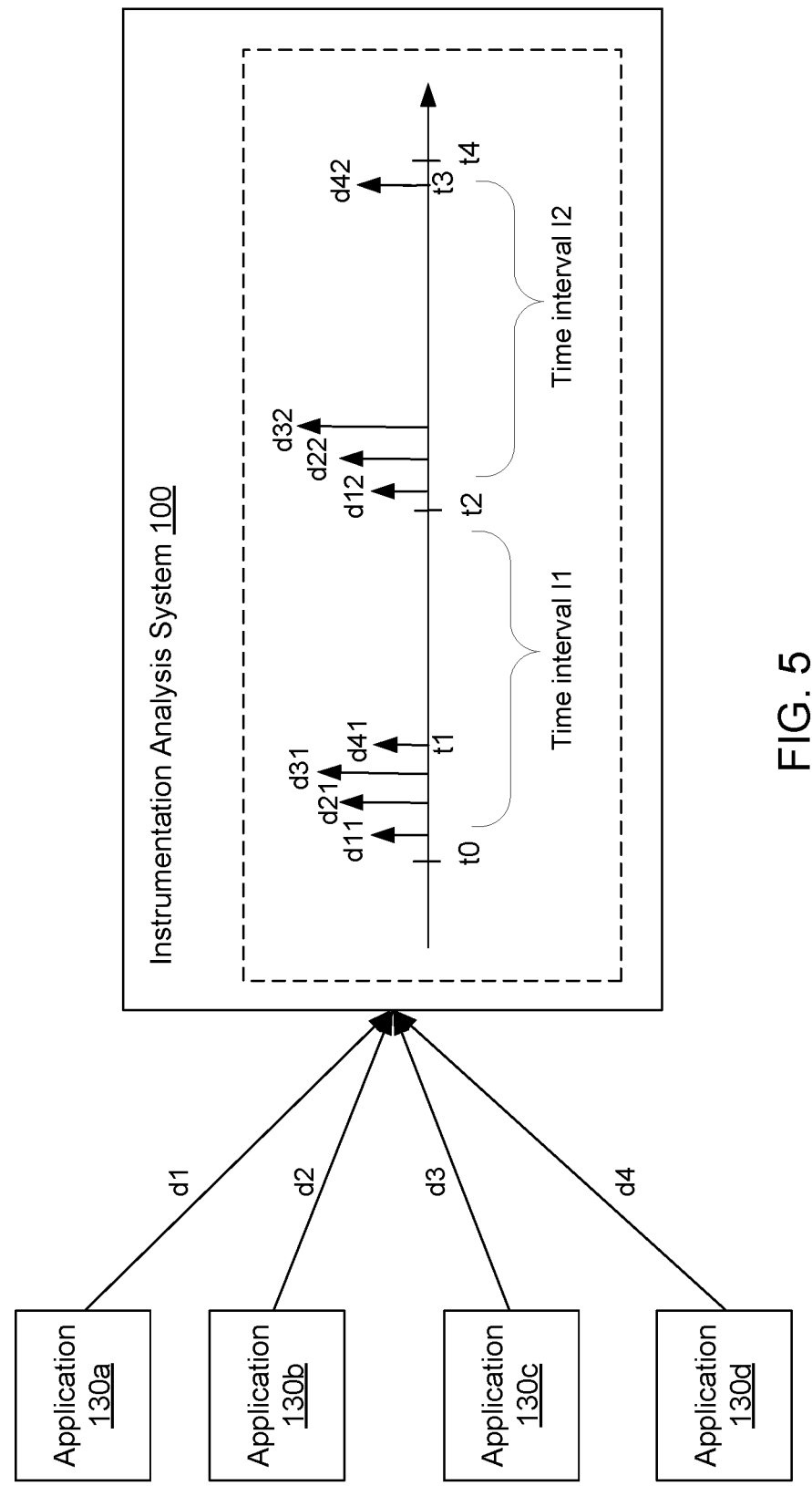
FIG. 5 shows the impact of arrival delays of data values on the processing of data streams by the instrumentation analysis system, according to an embodiment.

FIG. 5 shows the impact of arrival delays of data values on the processing of data streams by the instrumentation analysis system, according to an embodiment. FIG. 5 shows four data sources, applications 130a, 130b, 130c, and 130d sending data streams d1, d2, d3, and d4 respectively to the instrumentation analysis system 100. The data values of data stream dx are dx1, dx2, dx3, and so on, each sent for a particular time interval. For example, the data values of data stream d1 are d11, d12, and so on. All data values are assumed to be generated by their data sources at the beginning of a time interval. Accordingly, the difference between the time point at which a data value is shown in FIG. 5 along the time interval compared to the beginning of the time interval represents the delay after which the data value reaches the instrumentation analysis system 100 after being generated by the data source.

The time line shown in FIG. 5 shows two time intervals, I1 (from time t0 to t2) and I2 (from time t2 to t4), and so on. The instrumentation analysis system 100 receives data value d11 for time interval I1 and d12 for time interval I2 from data stream d1; data value d21 for time interval I1 and d22 for time interval I2 from data stream d2; data value d31 for time interval I1 and d32 for time interval I2 from data stream d3; and data value d41 for time interval I1 and d42 for time interval I2 from data stream d4.

As shown in FIG. 5, all data values, d11, d12, d13, and d14 arrive by time t1 in interval I1. The time point t1 is relatively early in the time interval I1, for example, all four data values arrive before less than half the time interval I1 is complete. Accordingly, the instrumentation analysis system 100 can compute the required expressions and display them as soon as possible after time t1. In contrast, during interval I2, even though data values d12, d22, and d32 have arrived early during the time interval I2, the data value d42 arrives at t3 which is almost at the end of the time interval I2. Accordingly, the instrumentation analysis system 100 is able to compute any required expressions and present the result only after time t3 which is almost at the end of the time interval I2.

As a result, long delays in receiving data values for a time interval result in an undesirable user experience. The results are presented much later than the time point when the data values were generated by the data sources. Furthermore, since the result of the time interval I1 is presented early within the time interval and the result of the time interval I2 is presented late during the time interval, there is a gap in the real-time chart during which no data is presented to the user, i.e., the gap between the time that the result for time interval I1 is presented and the time that the result for time interval I2 is presented. This gap is longer than a typical gap between the times that results are presented. Having long gaps during which no data is presented in a chart that is expected to be updated in real-time provides an undesirable use experience. Embodiments of the invention allow the instrumentation analysis system 100 to present the results to the user early during the time interval and reduce the gap between presentations of results between two consecutive time intervals.

Overall Process

Figure 6:
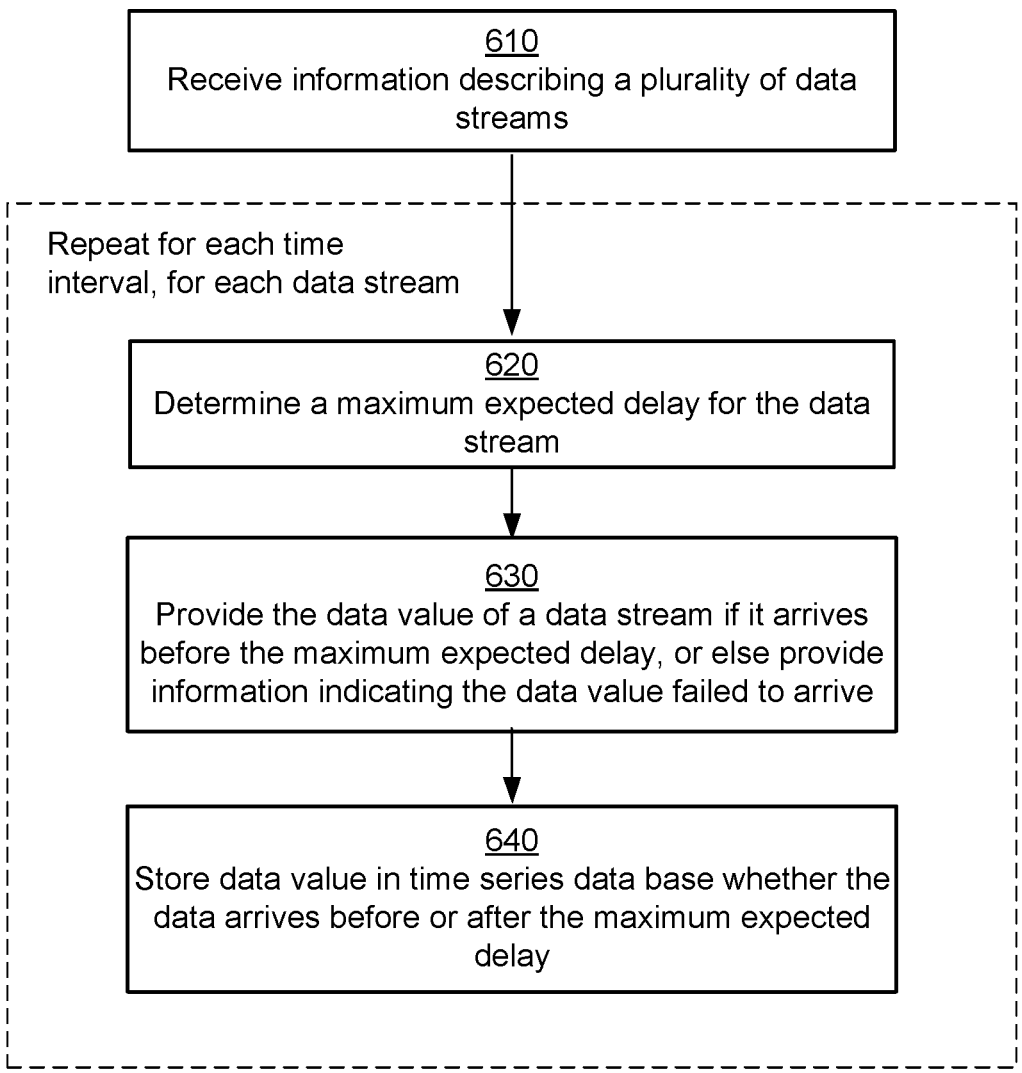
FIG. 6 shows an overall process for processing data streams by the instrumentation analysis system, according to an embodiment.
Figure 7:
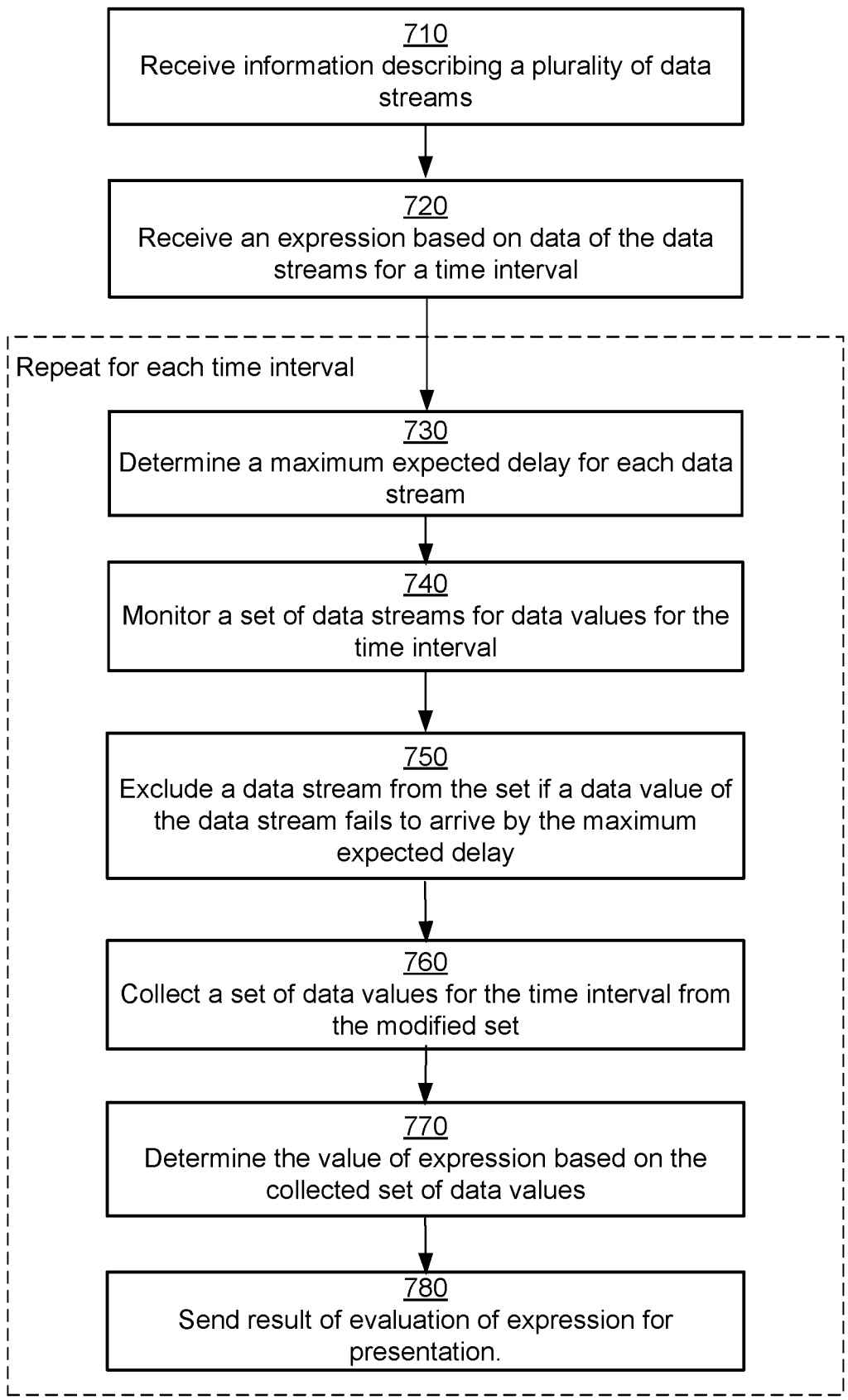
FIG. 7 shows the overall process for determining values of an expression based on data values of data streams received by the instrumentation analysis system, according to an embodiment.
Figure 8:
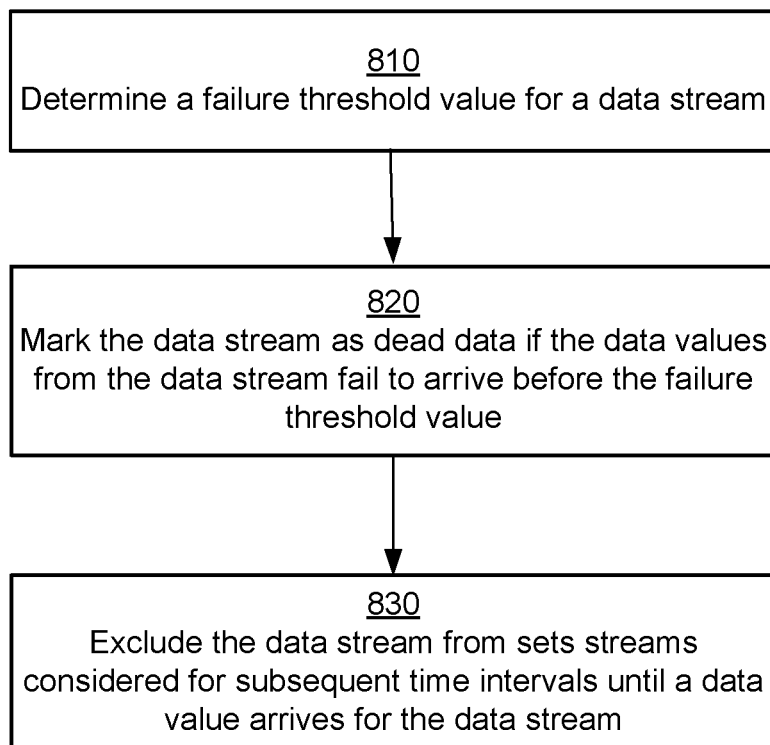
FIG. 8 shows the process of identifying failures of data sources sending data streams, according to an embodiment.

FIGS. 6, 7, and 8 illustrate various processes executed by the instrumentation analysis system for processing data received from instrumented software. Steps shown in the flowcharts illustrated in each figure may be executed in an order different from that shown in the figure. For example, certain steps may be executed concurrently with other steps. Furthermore, steps indicated as executed by certain modules may be executed by other modules.

FIG. 6 shows an overall process for processing data streams by the instrumentation analysis system, according to an embodiment. In an embodiment, the instrumentation analysis system 100 determines values of an expression over a plurality of time intervals. For example, the expression may aggregate data values received during the time interval as part of the data streams. In these embodiments, the process illustrated in FIG. 6 is executed by the instrumentation analysis system 100 to determine whether a data value should be used as input for evaluating the expression for a time interval.

If the instrumentation analysis system 100 determines that a data value of a data stream arrives early during a time interval, instrumentation analysis system 100 uses the data value as input for determining the value of the expression for the time interval. If the instrumentation analysis system 100 determines that a data value from a data stream arrives late or is not likely to arrive during the time interval, the instrumentation analysis system 100 evaluates the expression for the time interval without considering the late arriving data values. In other words, the instrumentation analysis system 100 excludes the late arriving data values from the inputs used for evaluating the expression for that time interval.

The interface module 210 receives 610 information describing a plurality of data streams from one or more external systems. The information describing the data streams may be provided by the external systems by invoking APIs of the instrumentation analysis systems. For example, the external systems may invoke an API of the instrumentation analysis system that allows the external system to register a data stream with the instrumentation analysis system 100 by providing information describing the data stream. The information describing a data stream includes a metric associated with the data stream (e.g., cache hit, cache miss, CPU load, memory usage, and so on), attributes describing the data source (e.g., service name), and so on.

The data stream processor 280 processes the data values received from the plurality of data streams for subsequent time intervals. The data stream processor 280 performs the following steps (620, 630, and U40) for each time interval and for each data stream.

The data stream processor 280 determines a maximum expected delay for each data stream. The data stream processor 280 may use a fixed threshold value associated with a data stream as a maximum expected delay. For example, the instrumentation analysis system 100 may receive, from a system administrator, a maximum expected delay as a configuration parameter for a data stream. In some embodiment, the data stream processor 280 determines the maximum expected delay for a data stream based on previous data values received for that data stream. For example, the data stream processor 280 may determine the maximum expected delay for a data stream based on a moving aggregate value based on the set of values received in the (e.g., a fixed number of past values, or all past values received within a moving time window.) As another example, the data stream processor 280 may determine the maximum expected delay for a data stream based on the last data value that was received from that data stream.

In an embodiment, the data stream processor 280 determines the maximum expected delay value by increasing an aggregate value based on past data values by a factor, for example, a fixed percentage value or by a fixed offset. For example, the data stream processor 280 may determine the maximum expected delay value for a data stream as the average of past 4 data values, scaled by 150%. As another example, the data stream processor 280 may determine the maximum expected delay value for a data stream as the last data value, increased by a fixed value, say 5 (the selection of the fixed value depends on the type of data being received in the data stream.)

The data stream processor 280 provides 630 the data values received from the data streams to a software module of the instrumentation analysis system 100 to further process the data values, for example, for presenting via a user interface as a real-time chart. For example, in an embodiment, the data stream processor 280 provides 630 the data values to the quantization module 240 to perform quantization using the data values. In another embodiment, the data stream processor 280 provides 630 the data values to the analytics engine 270 to evaluate an expression using the data values, for example, an expression determining an aggregate value using the data values received during a time interval.

The data stream processor 280 provides 630 the data value of a data stream to the quantization module (or any other module) for further processing if the data value of the data stream arrives at the instrumentation analysis system 100 before the maximum expected delay. If the data value of the data stream fails to arrive at the instrumentation analysis system 100 before the maximum expected delay, the data stream processor 280 provides 630 information indicating that the data value failed to arrive. In an embodiment, the data stream processor 280 provides 630 information indicating that the data value failed to arrive by providing a special data value (e.g., a null data value) to the module performing the subsequent processing.

The data stream processor 280 stores 640 the data values of data stream in a persistent store (e.g., the time series data store 260) whether the data values arrive before the maximum expected delay of the data stream or after the maximum expected delay. In other words the data stream processor 280 stores 640 the data values, irrespective of when the data value arrives at the instrumentation analysis system 100. The data stream processor 280 does not provide the data values of data stream that arrive after the maximum expected delay to the quantization module 240 or the analytics engine 270 for performing the real-time processing of the data, for example, to present a real-time chart. This is so because the data stream processor 280 is designed not to slow down the presentation of data in the real-time chart because of late arriving data values. However, the data stream processor 280 stores 640 the data values in the time series data store 260 even if they arrive after the maximum expected delay so that subsequent queries that process data of the data stream for that time interval use the data value independent of when the data value arrived.

FIG. 7 shows the overall process for determining values of an expression based on data values of data streams received by the instrumentation analysis system, according to an embodiment. The process illustrated in FIG. 7 shows steps similar to those shown in FIG. 6, but in the context of evaluating an expression and presenting the data as a real-time chart.

Similar to the step 610 of FIG. 6, the interface module 210 receives 710 information describing a plurality of data streams from one or more external systems. The analytics engine 270 receives 720 an expression based on data of the data streams for a time interval. The instrumentation analysis system 100 computes the value of the expression for each of a plurality of time intervals, for example, every second, every 2 seconds, or every 5 seconds. The expression may compute an aggregate value based on data values associated with the time interval. The data values associated with a time interval correspond to data values sent by an external system (i.e., data source of the data stream) for processing during the time interval. The data value may or may not arrive at the instrumentation analysis system 100 within the same time interval for which the data value is sent by the external system. As an example, the expression may compute a count, sum, average, median, a percentile value, or any other aggregate value over all data values associated with the time interval. As another example, the expression may compute the above aggregates over data values grouped by certain attribute. For example, the expression may compute a sum of data values grouped by a data center attribute, thereby determining a sum of data values arriving from each data center.

Similar to the step 620 of FIG. 6, the data stream processor 280 determines 730 a maximum expected delay value for each data stream that is considered for evaluating the expression. The set of data streams that is relevant for evaluation of an expression may be specified as part of the expression using metadata describing the data streams. An expression may identify the set of data stream by specifying values of one or more metadata attributes describing the data streams. For example, an expression may evaluate an aggregate value based on all data streams from a particular data center, identified by a specific value of a datacenter attribute. Another expression may specify all data streams providing a specific metric, for example, cache hits. The data stream processor 280 monitors 740 the set of data streams associated with the expression. In an embodiment, the data stream processor 280 monitors all the data streams received by the instrumentation analysis system, thereby also monitoring the set associated with the expression. In an embodiment, the data stream processor 280 monitors the data streams by creating a process or thread that waits for data values of the data stream to arrive.

The data stream processor 280 excludes 750 a data stream from the set considered for evaluating the expression for a time interval if the data values of the data stream arrive late, i.e., fail to arrive by the maximum expected delay of the data stream. In other words, the data stream processor 280 considers for evaluation of the expression in a time interval, only the data values that arrive before the maximum expected delay for the respective data stream. The data stream processor 280 collects 760 all data values of the set of data values (obtained by excluding the late arriving data values) and provides the data values for further processing, for example, to the quantization module 240 or the analytics engine 270.

The analytics engine 270 determines 770 the value of the expression based on the collected set of values provided by the data stream processor 280. The analytics engine 270 provides the result of evaluation of the expression to the user interface manager 290. The user interface manager 290 sends 780 the result of evaluation of the expression for presentation via a user interface, for example, as a real-time chart. The instrumentation analysis system 100 repeats the steps 730, 740, 750, 760, 770, and 780 for each subsequent time interval. These steps may be repeated indefinitely, for example, so long as a user wants to view the real-time chart.

The data stream processor 280 further maintains a failure threshold value to determine whether a data source providing a stream has failed, for example, as a result of the instrumented software sending the data stream or the external system providing the data stream crashing or failing. The failure threshold values used for determining whether a data stream has failed are typically longer than the maximum expected delay values of the data streams. For example, the failure threshold value may be as long as several time intervals. In contrast, the maximum expected delay value for a data stream is less than the length of a time interval. In an embodiment, the instrumentation analysis system 100 receives the value of a failure threshold for a data stream, for example, from a system administrator via the administration system 160. The instrumentation analysis system 100 may use a failure threshold value for a set of data streams, for example, for all data streams arriving from a data center or all data streams arriving from a type of external system, a type of operating system running on the external system, or the type of instrumented software providing the data stream.

If data stream processor 280 determines that a data value of a data stream failed to arrive before the failure threshold value, the data stream processor 280 marks the data stream as dead. In an embodiment, the instrumentation analysis system 100 stores the status of each data stream (dead or alive) in either the metadata store 230 or the time series data store 260. Accordingly, the data stream processor 280 excludes the dead data stream from all computations of expressions for subsequent time intervals until the status of the data stream is changed back to alive.

Accordingly, the data stream processor 280 does not wait for the data stream for the maximum expected delay associated with the data stream. This prevents the data stream processor 280 from having to wait the additional time (of the maximum expected delay of the data stream) for subsequent time intervals. A data stream may stay dead for long period of time. If the data stream processor 280 did not exclude the dead data stream from consideration in subsequent time intervals, the data stream processor 280 would continue to wait for the maximum expected delay of the data stream for an indefinite amount of time.

The data stream processor 280 starts including the data stream in sets of data streams considered for evaluation of expressions for subsequent time intervals as soon as the status of the data stream is changed from dead to alive. The data stream processor 280 changes the status of a dead data stream back to alive if a data value of the data stream arrives at the instrumentation analysis system after the data stream status was determined to be dead.

FIG. 8 shows the process of identifying failures of data sources sending data streams, according to an embodiment. The data stream processor 280 determines 810 a failure threshold value for a data stream. The data stream processor 280 monitors data streams for which data values arrive late (for example, after the maximum expected delay value) to check whether the data value arrives before the failure threshold value. If the data value of a data stream fails to arrive before the failure threshold value, the data stream processor 280 marks the data stream as dead. The data stream processor 280 may store a flag in the metadata store 230 indicating that the data stream is dead and the timestamp indicating the time at which the data stream was determined to be dead. The data stream processor 280 excludes 830 the data streams from sets of data streams considered for subsequent time intervals, for example, for evaluating expressions based on data streams. The data stream processor 280 excludes 830 the data streams until a data value of the data stream arrives.

Alternative Embodiments

It is to be understood that the Figures and descriptions of the present invention have been simplified to illustrate elements that are relevant for a clear understanding of the present invention, while eliminating, for the purpose of clarity, many other elements found in a typical IT management system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for processing data generated by instrumented software, the method comprising:
    determining, for a time interval of a plurality of time intervals, a maximum expected delay value for a data stream, the maximum expected delay value comprising a limit on an arrival delay for a data value of the data stream from the instrumented software to an analysis system, the maximum expected delay value comprising a moving average of data values multiplied by a numerical factor, wherein the maximum expected delay value is re-computed periodically at a beginning of each time interval or at an end of a previous time interval;
    modifying a set of data streams by excluding a data stream when the data value of the data stream fails to arrive within the maximum expected delay value for the data stream during the time interval;
    receiving a specification of an expression for processing data values of a plurality of data streams associated with the time interval;
    evaluating the expression using the data values of the modified set of data streams; and
    sending a result of evaluating the expression for presentation through a user interface.

2. The computer-implemented method of claim 1, further comprising:
    storing data values of data streams that arrive after the maximum expected delay value in a persistent data store.

3. The computer-implemented method of claim 1, further comprising:
    determining a failure threshold value for a data stream; and
    marking the data stream as dead if a data value of the data stream fails to arrive before the failure threshold value.

4. The computer-implemented method of claim 3, further comprising:
    excluding a data stream marked dead from the set of data streams monitored for arrival of data values for one or more subsequent time intervals.

5. The computer-implemented method of claim 3, further comprising:
    marking the data stream live if a data value is subsequently received for the data stream; and
    including the data stream in the set of data streams monitored for arrival of data values for one or more subsequent time intervals.

6. The computer-implemented method of claim 1, further comprising:
    configuring results of evaluation of the expression for presentation by a real-time chart that is updated for every time interval.

7. The computer-implemented method of claim 1, further comprising:
    receiving, by the analysis system, from one or more external systems, information identifying the plurality of data streams, each data stream generated by an instance of instrumented software executing on an external system.

8. The computer-implemented method of claim 1, wherein the expression aggregates the data values of the set of data streams, the data values associated with a time interval.

9. The computer-implemented method of claim 1, wherein the maximum expected delay value is determined based on historical arrival delays of data values of the data stream.

10. The computer-implemented method of claim 1, wherein the maximum expected delay value for a time interval is determined based on the arrival delay of the data value of the data stream for the previous time interval.

11. A system for processing data generated by instrumented software, the system comprising:
    at least one memory having instructions stored thereon; and
    at least one processor configured to execute the instructions, wherein the at least one processor is configured to:
        determine, for a time interval of a plurality of time intervals, a maximum expected delay value for a data stream, the maximum expected delay value comprising a limit on an arrival delay for a data value of the data stream from the instrumented software to an analysis system, the maximum expected delay value comprising a moving average of data values multiplied by a numerical factor, wherein the maximum expected delay value is re-computed periodically at a beginning of each time interval or at an end of a previous time interval;

modify a set of data streams by excluding a data stream when the data value of the data stream fails to arrive within the maximum expected delay value for the data stream during the time interval;

receive a specification of an expression for processing data values of a plurality of data streams associated with the time interval;

evaluate the expression using the data values of the modified set of data streams; and send a result of evaluating the expression for presentation through a user interface.

12. The system of claim 11, further configured to:
storing data values of data streams that arrive after the maximum expected delay value in a persistent data store.

13. The system of claim 11, further configured to:
determining a failure threshold value for a data stream; and
marking the data stream as dead if a data value of the data stream fails to arrive before the failure threshold value.

14. The system of claim 13, further configured to:
excluding a data stream marked dead from the set of data streams monitored for arrival of data values for one or more subsequent time intervals.

15. The system of claim 13, further configured to:
marking the data stream live if a data value is subsequently received for the data stream; and
including the data stream in the set of data streams monitored for arrival of data values for one or more subsequent time intervals.

16. The system of claim 11, further configured to:
configuring results of evaluation of the expression for presentation by a real-time chart that is updated for every time interval.

17. The system of claim 11, further configured to:
receiving, by the analysis system, from one or more external systems, information identifying the plurality of data streams, each data stream generated by an instance of instrumented software executing on an external system.

18. The system of claim 11, wherein the expression aggregates the data values of the set of data streams, the data values associated with a time interval.

19. The system of claim 11, wherein the maximum expected delay value is determined based on historical arrival delays of data values of the data stream.

20. The system of claim 11, wherein the maximum expected delay value for a time interval is determined based on the arrival delay of the data value of the data stream for the previous time interval.

21. A non-transitory computer-readable storage medium comprising instructions stored thereon, which when executed by one or more processors, cause the one or more processors to perform operations for processing data generated by instrumented software, comprising:

determining, for a time interval of a plurality of time intervals, a maximum expected delay value for a data stream, the maximum expected delay value comprising a limit on an arrival delay for a data value of the data stream from the instrumented software to an analysis system, the maximum expected delay value comprising a moving average of data values multiplied by a numerical factor, wherein the maximum expected delay value is re-computed periodically at a beginning of each time interval or at an end of a previous time interval;

modifying a set of data streams by excluding a data stream when the data value of the data stream fails to arrive within the maximum expected delay value for the data stream during the time interval;

receiving a specification of an expression for processing data values of a plurality of data streams associated with the time interval;

evaluating the expression using the data values of the modified set of data streams; and sending a result of evaluating the expression for presentation through a user interface.

22. The non-transitory computer-readable storage medium of claim 21, further configured for:
storing data values of data streams that arrive after the maximum expected delay value in a persistent data store.

23. The non-transitory computer-readable storage medium of claim 21, further configured for:
determining a failure threshold value for a data stream; and
marking the data stream as dead if a data value of the data stream fails to arrive before the failure threshold value.

24. The non-transitory computer-readable storage medium of claim 23, further configured for:
excluding a data stream marked dead from the set of data streams monitored for arrival of data values for one or more subsequent time intervals.

25. The non-transitory computer-readable storage medium of claim 23, further configured for:
marking the data stream live if a data value is subsequently received for the data stream; and
including the data stream in the set of data streams monitored for arrival of data values for one or more subsequent time intervals.

26. The non-transitory computer-readable storage medium of claim 21, further configured for:
configuring results of evaluation of the expression for presentation by a real-time chart that is updated for every time interval.

27. The non-transitory computer-readable storage medium of claim 21, further configured for:
receiving, by the analysis system, from one or more external systems, information identifying the plurality of data streams, each data stream generated by an instance of instrumented software executing on an external system.

28. The non-transitory computer-readable storage medium of claim 21, wherein the expression aggregates the data values of the set of data streams, the data values associated with a time interval.

29. The non-transitory computer-readable storage medium of claim 21, wherein the maximum expected delay value is determined based on historical arrival delays of data values of the data stream.

30. The non-transitory computer-readable storage medium of claim 21, wherein the maximum expected delay value for a time interval is determined based on the arrival delay of the data value of the data stream for the previous time interval.

* * * * *